(12) United States Patent
Gupta

(10) Patent No.: US 12,095,930 B2
(45) Date of Patent: Sep. 17, 2024

(54) SYSTEM AND METHOD FOR SECURE FILE-SHARING VIA A DISTRIBUTED NETWORK

(71) Applicant: BANK OF AMERICA CORPORATION, Charlotte, NC (US)

(72) Inventor: Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 488 days.

(21) Appl. No.: 17/567,213

(22) Filed: Jan. 3, 2022

(65) Prior Publication Data

US 2023/0216694 A1 Jul. 6, 2023

(51) Int. Cl.
| | |
|---|---|
| H04L 29/00 | (2006.01) |
| H04L 9/32 | (2006.01) |
| H04L 9/40 | (2022.01) |
| H04L 67/06 | (2022.01) |

(52) U.S. Cl.
CPC .......... *H04L 9/3263* (2013.01); *H04L 9/3236* (2013.01); *H04L 9/3247* (2013.01); *H04L 63/0236* (2013.01); *H04L 67/06* (2013.01)

(58) Field of Classification Search
CPC ... H04L 9/3263; H04L 9/3236; H04L 9/3247; H04L 63/0236; H04L 67/06; H04L 9/3268; H04L 9/50; H04L 63/0209; H04L 63/0428; H04L 63/0442; H04L 63/0823; H04L 67/1097
See application file for complete search history.

(56) References Cited

U.S. PATENT DOCUMENTS

| | | | |
|---|---|---|---|
| 5,202,971 A | 4/1993 | Henson et al. | |
| 5,649,196 A | 7/1997 | Woodhill et al. | |
| 7,743,033 B2 | 6/2010 | Patel et al. | |
| 8,327,436 B2 * | 12/2012 | Randle | H04L 63/0272 713/182 |
| 8,549,282 B2 * | 10/2013 | Sabo | H04L 9/0825 713/160 |
| 8,694,564 B2 | 4/2014 | Guarraci | |
| 8,806,572 B2 * | 8/2014 | McGrew | H04L 63/1408 713/153 |
| 9,948,677 B2 | 4/2018 | Ruppin et al. | |
| 10,218,682 B1 * | 2/2019 | Kawach | H04L 9/3242 |
| 10,445,517 B1 | 10/2019 | Whaley et al. | |
| 10,764,752 B1 * | 9/2020 | Avetisov | H04L 63/0823 |

(Continued)

*Primary Examiner* — Don G Zhao
(74) *Attorney, Agent, or Firm* — Moore & Van Allen PLLC; Nicholas C. Russell

(57) ABSTRACT

Systems, computer program products, and methods are described herein for secure file-sharing. The present invention may be configured to receive a request to store data on a network, process the request through a firewall. Processing the request includes: generating a first electronic digital certificate, storing the first electronic digital certificate on a distributed ledger, encrypting the data using the first electronic digital certificate, storing the encrypted data on at least one of the plurality of data server nodes, and recording the request on the distributed ledger. The present invention is further configured to receive and process a second request. Processing the second request includes: decrypting the data using the second electronic digital certificate, providing the decrypted data to the second requestor, and recording the second request on the distributed ledger.

20 Claims, 3 Drawing Sheets

(56) References Cited

U.S. PATENT DOCUMENTS

| | | | |
|---|---|---|---|
| 10,812,452 B2 | 10/2020 | Shetty et al. | |
| 10,841,237 B2 | 11/2020 | Todd et al. | |
| 11,783,062 B2* | 10/2023 | Lounsberry | G06F 21/6218 |
| | | | 726/30 |
| 2002/0059245 A1 | 5/2002 | Zakharov et al. | |
| 2003/0233582 A1* | 12/2003 | Pemmaraju | H04L 63/029 |
| | | | 726/12 |
| 2004/0133570 A1 | 7/2004 | Soltis | |
| 2005/0177749 A1 | 8/2005 | Ovadia | |
| 2008/0019527 A1 | 1/2008 | Youn et al. | |
| 2008/0104146 A1* | 5/2008 | Schwaab | G06F 11/1453 |
| 2010/0058054 A1* | 3/2010 | Irvine | H04L 63/08 |
| | | | 726/28 |
| 2012/0204032 A1* | 8/2012 | Wilkins | H04L 9/321 |
| | | | 713/170 |
| 2012/0209749 A1* | 8/2012 | Hammad | G06Q 20/20 |
| | | | 705/27.1 |
| 2012/0328105 A1* | 12/2012 | Mukkara | H04L 9/0897 |
| | | | 380/277 |
| 2013/0138570 A1* | 5/2013 | Ross | H04L 63/0428 |
| | | | 705/76 |
| 2014/0237614 A1* | 8/2014 | Irvine | H04L 63/083 |
| | | | 726/26 |
| 2015/0006895 A1* | 1/2015 | Irvine | G06F 21/6209 |
| | | | 713/171 |
| 2017/0270399 A1* | 9/2017 | Ross | G06K 19/07722 |
| 2018/0253539 A1* | 9/2018 | Minter | G06F 21/64 |
| 2019/0386969 A1* | 12/2019 | Verzun | G06F 21/606 |
| 2020/0067907 A1* | 2/2020 | Avetisov | H04L 67/133 |
| 2021/0044976 A1* | 2/2021 | Avetisov | G06F 21/64 |
| 2021/0167972 A1* | 6/2021 | Zang | H04L 63/0823 |
| 2022/0391901 A1* | 12/2022 | Park | G06Q 20/4014 |

* cited by examiner

SYSTEM AND METHOD FOR SECURE FILE-SHARING VIA A DISTRIBUTED NETWORK

FIELD OF THE INVENTION

The present invention embraces an electronic system for secure file-sharing.

BACKGROUND

The world is rapidly moving towards file-sharing storage such as cloud data storage for cost effective solutions. File-sharing methods such as these involve saving important files, information, and data in a remote database. These methods come with a particular set of vulnerabilities and security hazards. As these platforms are physically located with a third-party, the user may never be completely confident about data security. Current methods of data security involve the installation of firewalls and the protection of data through authentication, however virtual and physical data misappropriation is still a possibility. Therefore, a need exists for a system and method to fully secure data from virtual and physical misappropriation.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for secure file-sharing is presented. The system may include at least one non-transitory storage device and at least one processing device coupled to the at least one non-transitory storage device, where the at least one processing device may be configured to: receive a request, from a requestor, to store data on a network. The network may contain a plurality of data server nodes. The at least one processing device may be further configured to process the request through a firewall containing at least one edge node. Processing the request may include the at least one edge node generating a first electronic digital certificate, storing the first electronic digital certificate on a distributed ledger, encrypting the data using the first electronic digital certificate, storing the encrypted data on at least one of the plurality of data server nodes, and recording the request on the distributed ledger.

The at least one processing device may be further configured to receive a second request, from a second requestor, to retrieve data from the network. The second request may contain a second electronic digital certificate. The at least one processing device may be further configured to process the second request through a firewall containing at least one edge node. Processing the request may include the at least one edge node retrieving the encrypted data from the at least one of the plurality of data server nodes, decrypting the data using the second electronic digital certificate, providing the decrypted data to the second requestor, and recording the second request on the distributed ledger.

In another aspect, a computer program product for secure file-sharing is presented. The computer program product may include a non-transitory computer-readable medium including code causing a first apparatus to: receive a request, from a requestor, to store data on a network. The network may contain a plurality of data server nodes. The non-transitory computer-readable medium may further include code causing a first apparatus to process the request through a firewall containing at least one edge node. Processing the request may include the at least one edge node generating a first electronic digital certificate, storing the first electronic digital certificate on a distributed ledger, encrypting the data using the first electronic digital certificate, storing the encrypted data on at least one of the plurality of data server nodes, and recording the request on the distributed ledger.

The non-transitory computer-readable medium may further include code causing a first apparatus to receive a second request, from a second requestor, to retrieve data from the network. The second request may contain a second electronic digital certificate. The non-transitory computer-readable medium may further include code causing a first apparatus to process the second request through a firewall containing at least one edge node. Processing the request may include retrieving the encrypted data from the at least one of the plurality of data server nodes, decrypting the data using the second electronic digital certificate, providing the decrypted data to the second requestor, and recording the second request on the distributed ledger.

In yet another aspect, a method for secure file-sharing is provided. The method may include receiving a request, from a requestor, to store data on a network. The network may contain a plurality of data server nodes. The method may further include processing the request through a firewall containing at least one edge node. Processing the request may include the at least one edge node generating a first electronic digital certificate, storing the first electronic digital certificate on a distributed ledger, encrypting the data using the first electronic digital certificate, storing the encrypted data on at least one of the plurality of data server nodes, and recording the request on the distributed ledger.

The method may further include receiving a second request, from a second requestor, to retrieve data from the network. The second request may contain a second electronic digital certificate. The method may further include processing the second request through a firewall containing at least one edge node. Processing the request may include retrieving the encrypted data from the at least one of the plurality of data server nodes, decrypting the data using the second electronic digital certificate, providing the decrypted data to the second requestor, and recording the second request on the distributed ledger.

In some embodiments, the at least one processing device is further configured to store the encrypted data on a secondary server. Additionally, or alternatively, the firewall further includes additional authentication requirements. In some embodiments, the network is a private network, a public network, or a hybrid network. Additionally, or alternatively, recording the request on the distributed ledger includes recording information identifying at least one of an identification of the requestor, a geographical location of the requestor, or a time of the request. In some embodiments, the first electronic digital certificate and the second electronic digital certificate are the same. In other embodiments, the first electronic digital certificate and the second electronic digital certificate are different.

BRIEF DESCRIPTION OF THE DRAWINGS

Figure 1:
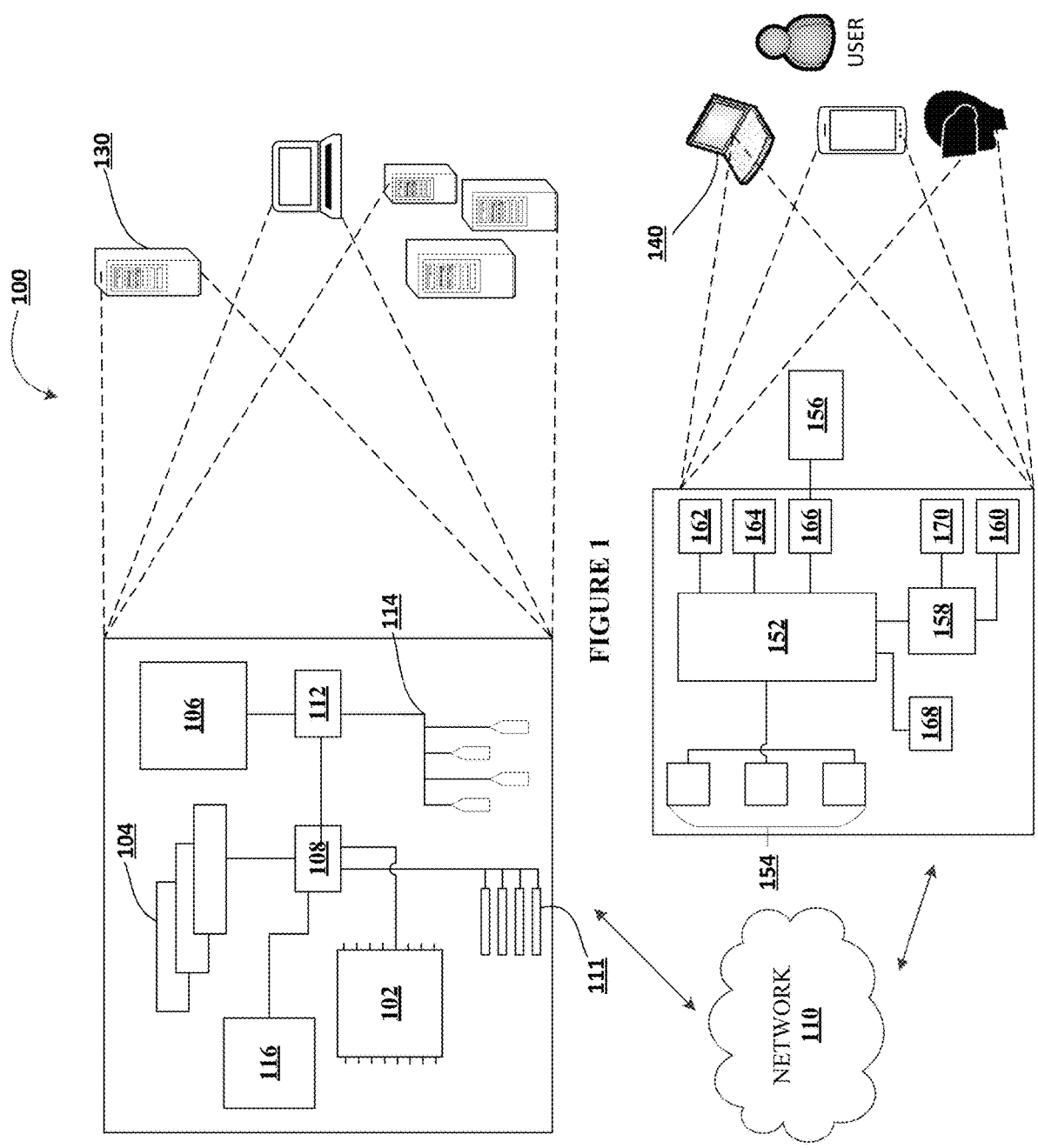
Figure 2:
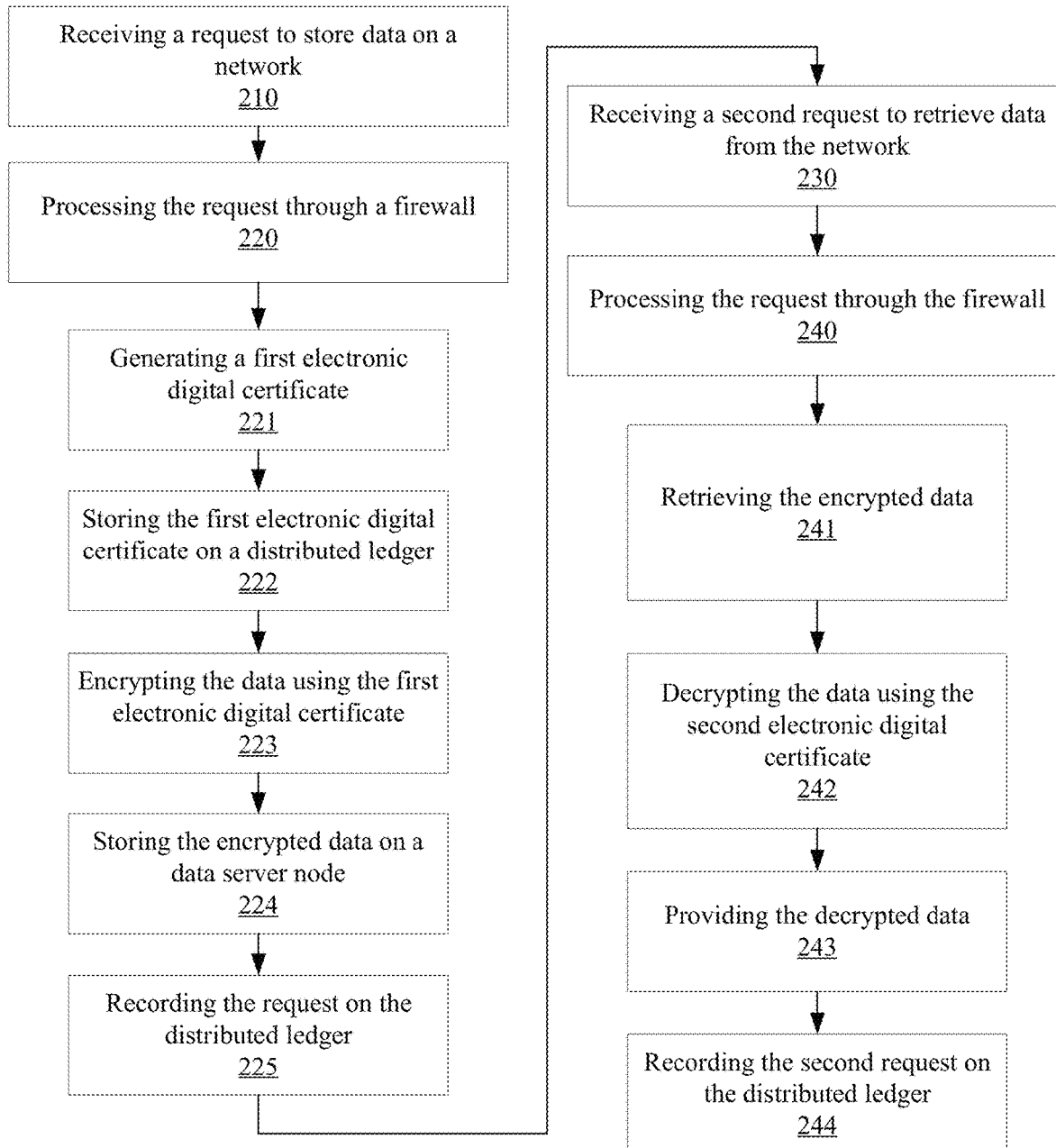
Figure 3:
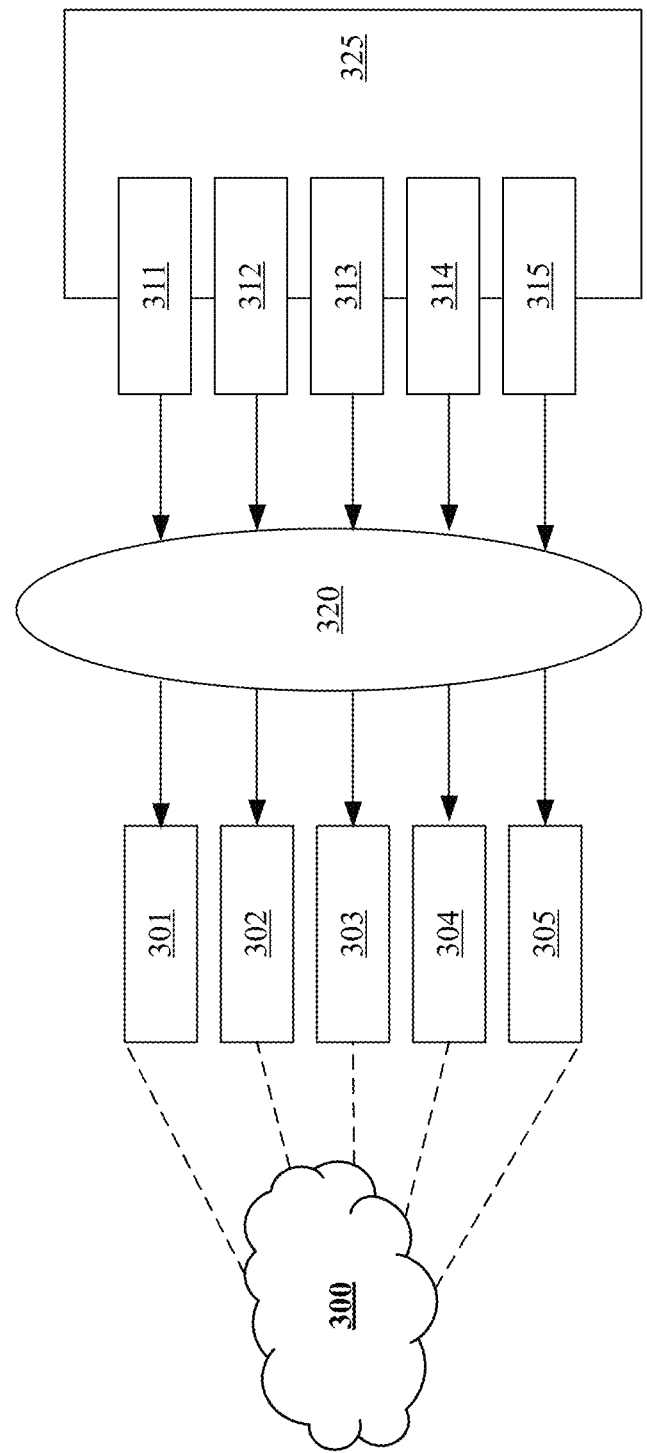

Having thus described embodiments of the invention in general terms, reference will now be made the accompanying drawings, wherein:

FIG. 1 illustrates technical components of a system for secure file-sharing, in accordance with an embodiment of the invention;

FIG. 2 illustrates a process flow for secure file-sharing, in accordance with an embodiment of the invention; and FIG. 3 illustrates a network diagram for secure file-sharing, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, to create a more secure file-sharing or cloud service, the system and method will utilize electronic digital certificates, such as non-fungible tokens (NFTs). The electronic digital certificates will secure the file-sharing platform by securing each server instance with a different and unique electronic digital certificate. The owner of the file-sharing platform, their credentials, geographical location, cloud instance credentials, and other information will form a unique alpha numeric pattern which will serve as the electronic digital certificate. The electronic digital certificate will be immutable and will be stored with the file-sharing service organization. All electronic digital certificates will be stored in a distributed ledger, as well as any activity done on each node.

This technology will enable the file-sharing service to send the data to nearby edge nodes, the node may encrypt the data using the electronic digital certificate and send the data back to the file-sharing service. Actual data will not be stored on the file-sharing platform. This will prevent physical data misappropriation as well. The data and files stored on the file-sharing platform may also be protected via use of the electronic digital certificate token as a password.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or the like employing information technology resources for processing large amounts of data. In some embodiments, the entity may be an institution, group, association, financial institution, establishment, company, union, authority, merchant, service provider, and/or the like hosting, sponsoring, coordinating, creating, and/or the like events, recognitions, achievements, and/or the like.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein. In some embodiments, a user may be a verified authority as described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes; and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

As used herein, identifiers such as "first," "second," "third," and/or the like do not indicate a temporal relationship, unless explicitly stated. Such identifiers may modify instances of similar things and may be used to differentiate between each of the instances.

As used herein, a "subset" may refer to one or more from a group. For example, a subset of users from a group of users may be one user from the group of users, multiple users from the group of users, or all of the users from the group of users. As another example, a subset of properties may be one property from the properties, multiple properties from the properties, or all of the properties.

FIG. 1 presents an exemplary block diagram of a system environment 100 for secure file-sharing, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes including generating electronic digital certificates, encrypting data, decrypting data, and storing information on a distributed ledger, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems, one or more electronic digital certificate generating systems, and/or one or more server systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to store data and/or the like using one or more systems, applications, services, and/or the like (e.g., similar to the system 130, running a system similar to the system 130, and/or the like) and the user input system may encrypt the data using the electronic digital certificate and distributed ledger (e.g., similar to the system 130, running a system similar to the system 130, and/or the like). In some embodiments, the user input system, the electronic digital certificate generating system, and/or the server system associated with the entity may perform one or more of the steps described herein with respect to the process flows described herein with respect to FIG. 2.

FIG. 2 illustrates a process flow 200 for secure file-sharing, in accordance with an embodiment of the invention. In some embodiments, the secure file-sharing system and/or the like (e.g. similar to one or more of the systems described herein with respect to FIG. 1) may perform one or more of the steps of process flow 200.

As shown in block 210, the process flow 200 may include receiving a request to store data on a network from a first requestor. For example, a requestor, or user, may request to store data on a network or server such as a cloud network or cloud server. Additionally, or alternatively a requestor, or user, may request to retrieve data from the network or server.

As shown in block 220, the process flow 200 may include processing the request through a firewall. For example, processing the request through a firewall may include processing the request through a security system. The firewall, or security system, may be set up by the entity. The firewall may also be setup by the manager of the server. In some embodiments, there is more than one firewall. The firewall contains at least one edge node. The edge node performs the functions required to process the request.

As shown in block 221, the process flow 200 may include, as part of processing the request, generating a first electronic digital certificate. An electronic digital certificate is a unique unit of data stored on a distributed ledger. The electronic digital certificate may be a non-fungible token (NFT).

As shown in block 222, the process flow 200 may include, as part of processing the request, storing the first electronic digital certificate on a distributed ledger. The distributed ledger may be a public distributed ledger or a private distributed ledger.

As shown in block 223, the process flow 200 may include, as part of processing the request, encrypting the data using the first electronic digital certificate. The electronic digital certificate is used as a key for encrypting the data for storage.

As shown in block 224, the process flow 200 may include, as part of processing the request, storing the encrypted data on a data server node. The encrypted data is stored on at least one of the plurality of data server nodes.

As shown in block 225, the process flow 200 may include, as part of processing the request, recording the request on the distributed ledger. The request is recorded to keep a record of the data. For example, who, when, and where the data was accessed may be recorded, as well as who, when, and where the data was created.

As shown in block 230, the process flow 200 may include receiving a second request to retrieve data from the network. The second request may come from a second requestor. The second requestor may be the same as the first requestor, or the second requestor may be different from the first requestor.

As shown in block 240, the process flow 200 may include processing the request through the firewall. In some embodiments, there is more than one firewall. The firewall contains at least one edge node. The edge node performs the functions required to process the request.

As shown in block 241, the process flow 200 may include, as part of processing the request, retrieving the encrypted data from at least one of the plurality of data server nodes.

As shown in block 242, the process flow 200 may include, as part of processing the request, decrypting the data using the second electronic digital certificate. The second electronic digital certificate serves as a key for decrypting the data.

As shown in block 243, the process flow 200 may include, as part of processing the request, providing the decrypted data to the second requestor.

As shown in block 244, the process flow 200 may include, as part of processing the request, recording the second request on the distributed ledger.

In a first embodiment, the system may store the encrypted data on a secondary server. This may be done to back-up the data.

In a second embodiment alone or in combination with the first embodiment, the firewall may have additional authentication requirements. Authentication requirements include but are not limited to a password or a one-time authentication event.

In a third embodiment alone or in combination with any of the first through second embodiments, recording the request on the distributed ledger includes recording information identifying at least one of an identification of the requestor, a geographical location of the requestor, or a time of the request.

In a fourth embodiment alone or in combination with any of the first through third embodiments, the first electronic digital certificate and the second electronic digital certificate may be the same. This allows for symmetric cryptography, where the same electronic digital certificate is used to encrypt and decrypt the data.

In a fifth embodiment alone or in combination with any of the first through fourth embodiments, the first electronic digital certificate and the second electronic digital certificate may be different. This allows for asymmetric cryptography, where different electronic digital certificates are used to encrypt and decrypt the data.

Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

As shown in FIG. 3, the server or network 300 is comprised of multiple server nodes 301, 302, 303, 304, and 305. The system stores the electronic digital certificates 311, 312, 313, 314, and 315 on a distributed ledger 325. The data and the electronic digital certificates 311, 312, 313, 314, and 315 are processed through the firewall 320, which contains at least one edge node, to encrypt the data using the electronic digital certificates and to store the encrypted data on the server nodes 301. 302, 303, 304, and 304 within the server or network 300. The firewall 320 contains at least one edge node.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for secure file-sharing, the system comprising at least one non-transitory storage device, and
at least one processing device coupled to the at least one non-transitory storage device, wherein the at least one processing device is configured to:
    receive a request, from a requestor, to store data on a network, wherein the network comprises a plurality of data server nodes;
    process the request through a firewall, wherein the firewall comprises at least one edge node, wherein processing the request comprises:
        the at least one edge node generating a first electronic digital certificate,
        the at least one edge node storing the first electronic digital certificate on a distributed ledger,
        the at least one edge node encrypting the data using the first electronic digital certificate, the at least one edge node storing the encrypted data on at least one of the plurality of data server nodes, and the at least one edge node recording the request on the distributed ledger;

receive a second request, from a second requestor, to retrieve data from the network, wherein the request comprises a second electronic digital certificate; and process the second request through the firewall, wherein processing the second request comprises:

the at least one edge node retrieving the encrypted data from the at least one of the plurality of data server nodes, the at least one edge node decrypting the data using the second electronic digital certificate, the at least one edge node providing the decrypted data to the second requestor, and the at least one edge node recording the second request on the distributed ledger.

2. The system for secure file-sharing according to claim 1, wherein the at least one processing device is further configured to store the encrypted data on a secondary server.

3. The system for secure file-sharing according to claim 1, wherein the firewall further comprises additional authentication requirements.

4. The system for secure file-sharing according to claim 1, wherein the network is a private network, a public network, or a hybrid network.

5. The system for secure file-sharing according to claim 1, wherein recording the request on the distributed ledger comprises recording information identifying at least one of an identification of the requestor, a geographical location of the requestor, or a time of the request.

6. The system for secure file-sharing according to claim 1, wherein the first electronic digital certificate and the second electronic digital certificate are the same.

7. The system for secure file-sharing according to claim 1, wherein the first electronic digital certificate and the second electronic digital certificate are different.

8. A computer program product for secure file-sharing, the computer program product comprising a non-transitory computer-readable medium comprising code causing a first apparatus to:

receive a request, from a requestor, to store data on a network, wherein the network comprises a plurality of data server nodes;

process the request through a firewall, wherein the firewall comprises at least one edge node, wherein processing the request comprises:

the at least one edge node generating a first electronic digital certificate, the at least one edge node storing the first electronic digital certificate on a distributed ledger, the at least one edge node encrypting the data using the first electronic digital certificate, the at least one edge node storing the encrypted data on at least one of the plurality of data server nodes, and the at least one edge node recording the request on the distributed ledger;

receive a second request, from a second requestor, to retrieve data from the network, wherein the request comprises a second electronic digital certificate; and process the second request through the firewall, wherein processing the second request comprises:

the at least one edge node retrieving the encrypted data from the at least one of the plurality of data server nodes, the at least one edge node decrypting the data using the second electronic digital certificate, the at least one edge node providing the decrypted data to the second requestor, and the at least one edge node recording the second request on the distributed ledger.

9. The computer program product for secure file-sharing according to claim 8, wherein the at least one processing device is further configured to store the encrypted data on a secondary server.

10. The computer program product for secure file-sharing according to claim 8, wherein the firewall further comprises additional authentication requirements.

11. The computer program product for secure file-sharing according to claim 8, wherein the network is a private network, a public network, or a hybrid network.

12. The computer program product for secure file-sharing according to claim 8, wherein recording the request on the distributed ledger comprises recording information identifying at least one of an identification of the requestor, a geographical location of the requestor, or a time of the request.

13. The computer program product for secure file-sharing according to claim 8, wherein the first electronic digital certificate and the second electronic digital certificate are the same.

14. The computer program product for secure file-sharing according to claim 8, wherein the first electronic digital certificate and the second electronic digital certificate are different.

15. A method for secure file-sharing, the method comprising:

receiving a request, from a requestor, to store data on a network, wherein the network comprises a plurality of data server nodes;

processing the request through a firewall, wherein the firewall comprises at least one edge node, wherein processing the request comprises:

the at least one edge node generating a first electronic digital certificate, the at least one edge node storing the first electronic digital certificate on a distributed ledger, the at least one edge node encrypting the data using the first electronic digital certificate, the at least one edge node storing the encrypted data on at least one of the plurality of data server nodes, and the at least one edge node recording the request on the distributed ledger;

receiving a second request, from a second requestor, to retrieve data from the network, wherein the request comprises a second electronic digital certificate; and processing the second request through the firewall, wherein processing the second request comprises:

the at least one edge node retrieving the encrypted data from the at least one of the plurality of data server nodes, the at least one edge node decrypting the data using the second electronic digital certificate, the at least one edge node providing the decrypted data to the second requestor, and the at least one edge node recording the second request on the distributed ledger.

16. The method for secure file-sharing according to claim 15, wherein the at least one processing device is further configured to store the encrypted data on a secondary server.

17. The method for secure file-sharing according to claim 15, wherein the firewall further comprises additional authentication requirements.

18. The method for secure file-sharing according to claim 15, wherein the network is a private network, a public network, or a hybrid network.

19. The method for secure file-sharing according to claim 15, wherein recording the request on the distributed ledger comprises recording information identifying at least one of an identification of the requestor, a geographical location of the requestor, or a time of the request.

20. The method for secure file-sharing according to claim 15, wherein the first electronic digital certificate and the second electronic digital certificate are the same.

* * * * *